(12) United States Patent
Schmitt et al.

(10) Patent No.: US 6,497,511 B1
(45) Date of Patent: Dec. 24, 2002

(54) METHOD AND DEVICE FOR IMAGING IN DIGITAL DENTAL RADIOSCOPY

(75) Inventors: Peter Schmitt, Erlangen (DE); Günther Kostka, Erlangen (DE); Randolf Hanke, Fürth (DE)

(73) Assignee: Fraunhofer-Gesellschaft zur Foerderung der angewandten Forschung e.V. (DE)

( * ) Notice: Subject to any disclaimer, the term of this patent is extended or adjusted under 35 U.S.C. 154(b) by 0 days.

(21) Appl. No.: 09/701,052
(22) PCT Filed: Apr. 28, 1999
(86) PCT No.: PCT/EP99/02886
§ 371 (c)(1), (2), (4) Date: Dec. 22, 2000
(87) PCT Pub. No.: WO99/62250
PCT Pub. Date: Dec. 2, 1999

(30) Foreign Application Priority Data

May 28, 1998 (DE) .......................................... 198 23 958

(51) Int. Cl.$^7$ ............................................... G01D 18/00
(52) U.S. Cl. ........................ 378/207; 378/38; 378/168
(58) Field of Search ................................. 348/241, 243, 348/244, 246, 247, 251; 378/98.8, 38, 62, 168, 191, 207

(56) References Cited

U.S. PATENT DOCUMENTS 5,465,284 A 11/1995 Karellas ...................... 378/62
5,617,461 A * 4/1997 Schreiner ................... 378/98.5
5,970,115 A * 10/1999 Colbeth et al. ............... 378/62
6,002,433 A * 12/1999 Watanabe et al. ........... 348/246

FOREIGN PATENT DOCUMENTS

| DE | 195 25 678 A1 | 1/1996 |
| DE | 196 15 178 C2 | 10/1997 |
| DE | 196 15 178 A1 | 10/1997 |
| DE | 197 33 338 A1 | 2/1999 |

* cited by examiner

Primary Examiner—Drew A. Dunn
Assistant Examiner—Therese Barber
(74) Attorney, Agent, or Firm—Patton Boggs LLP (57) ABSTRACT

In a method for imaging in digital dental radioscopy making use of a sensor array, the individual image elements of which are smaller than a desired local resolution so that a plurality of image elements forms a respective effective image element, first reference signals, which are generated by the image elements of the sensor array when said sensor array is not exposed to X-radiation, are initially detected. In addition, second reference signals, which are generated by the image elements of the sensor array when said sensor array is exposed to X-radiation, are detected. Subsequently, defective image elements are determined on the basis of the detected first and second reference signals, whereupon an image of an object is produced using exclusively the image elements that have been determined as being non-defective. Furthermore, during production of the image of an object, it can be determined for the object signals detected for the respective image elements whether said image elements have been hit directly by an X-ray quantum. Image elements that have been hit directly by an X-ray quantum are not used for producing the image of the object.

30 Claims, 2 Drawing Sheets

METHOD AND DEVICE FOR IMAGING IN DIGITAL DENTAL RADIOSCOPY

BACKGROUND OF THE INVENTION

1. Field of the Invention

The present invention relates to methods and devices for imaging in digital dental radioscopy, and especially to methods and devices making use of sensor arrays whose image elements are smaller than would be necessary for the desired local resolution.

2. Description of Prior Art

Dental X-ray diagnostic units in which images are produced digitally making use of CCD sensors (CCD =charge coupled device) have been known for some time. The sensors used normally comprise the CCD sensor itself and a scintillation layer which is applied directly to the CCD sensor and which converts the incident X-radiation into visible light which will then generate an electric charge in the underlying CCD sensor. The image information is then read from the CCD sensor by applying suitable clock signals, whereupon it is preprocessed, digitized and finally transmitted to a computer system, e.g. a personal computer, for display and storage. In comparison with a conventional film technique, this method is primarily advantageous insofar as images are obtained much faster.

An example of such X-ray diagnostic units is described in DE-A-19615178. The diagnostic unit described in this publication additionally comprises a correction means for compensating fluctuations of the electric signals of the individual elements of the CCD array caused by a dark current of these elements, by different conversion efficiencies of these elements and by inhomogeneities of the scintillation layer.

The size of the image elements of the CCD sensor, which are also referred to as pixels, is normally adapted to the desired local resolution. Furthermore, image elements which are smaller than the desired local resolution can be used, image information of neighbouring image elements being then already combined on the sensor. This course of action is referred to as binning. An effective image element whose size corresponds again to the desired local resolution is obtained in this way. The resolution demanded in the field of digital dental radioscopy is typically a resolution of from 50 $\mu$m to 60 $\mu$m. A higher resolution will normally not make sense, since the scintillator required for converting the X-radiation into visible light will normally not permit a higher resolution. It is true that a higher resolution can be achieved by particularly thin scintillation layers, but this is disadvantageous insofar as only a very small percentage of the X-radiation can be detected by means of these very thin scintillation layers and, due to a correspondingly lower signal-to-noise ratio, this will lead to a deterioration of the image quality.

The necessary total area of such a sensor for dental radioscopy amounts to several square centimetres, since, if the total area of the sensor is smaller than that, it will be difficult to show a whole tooth on a single X-ray image. The size of the sensors is normally adapted to the size of conventional tooth films, which usually starts with a size of 2×3 cm$^2$.

Known dental radioscopy techniques have a plurality of disadvantages. On the one hand, the image quality of digital dental X-ray photographs is usually not yet satisfactory, since the image is very noisy. One reason for this is that only a small number of X-ray quanta per image element contributes to the production of the image, since the patient should only be exposed to a small dose for medical reasons; this leads to quantum noise. In addition to this quantum noise, a second source of noise exists, since only part of the X-radiation falling on the X-ray sensor is absorbed by the scintillation layer and converted into visible light, whereas part of the X-radiation passes through the scintillation layer and can be absorbed in the CCD sensor itself, the CCD sensor consisting preferably of silicon. Such an absorption of X-ray quanta in the silicon of the CCD sensor will be referred to as "direct hit" in the following. This effect is undesired, since X-ray quanta converted in the scintillation layer generate only a small charge in the CCD sensor, typically a charge in the range of a few hundred electrons. Direct hits, however, generate in comparison therewith a very high charge, typically a charge in the range of ten thousands of electrons. Hence, a direct hit will typically produce a charge which is 50 times as high as an X-ray quantum converted in the scintillator. Direct hits will therefore contribute to image noise to a very high extent.

Another problem of known sensors is to be seen in that, only in the most advantageous cases will it be possible to produce sensors of the above-mentioned geometrical size which do not have any fault whatsoever. Frequently, individual image elements or several neighbouring image elements, so-called clusters, or even complete lines or columns of the sensor will fail to contribute. In this connection defects occur in the case of which the defective image element or pixel generates a large image signal without exposure as well as defects in the case of which the defective image element, though exposed, does not generate any image signal. Depending on the number and kind of such defects, a distinction is made between various sensor qualities which are suitable for different cases of use. When the number of defects is excessively large, i.e. when the quality of the sensor is too poor, the sensor cannot be employed for the intended use, i.e. for dental radioscopy, since, due to the defective image elements, the dentist may perhaps fail to notice important image information. This, however, has the consequence that a substantial percentage of the sensors produced cannot be used, and this leads to a considerable increase in the price of the usable sensors.

U.S. Pat. No. 5,617,461 teaches that, making use of at least one calibration image, a defect image is produced. An image recorded from an object is then corrected making use of the defect image, this correction being carried out by means of linear interpolation.

U.S. Pat. No. 5465284 shows how a plurality of CCD sensors, which have been combined to form an image element, can be processed. The local resolution of the image is reduced in comparison with the resolution of the sensor in this way, whereas the signal-to-noise ratio is improved.

SUMMARY OF THE INVENTION

It is the object of the present invention to provide methods and devices for imaging in digital dental radioscopy, which permit the use of sensor arrays that are less expensive to produce while maintaining or improving the quality of the image produced.

According to a first aspect of the present invention, this object is achieved by a method for imaging in digital dental radioscopy making use of a sensor array, the individual image elements of which are smaller than a desired local resolution, so that a plurality of image elements forms a respective effective image element, comprising the steps of:

a) detecting first reference signals which are generated by the image elements of the sensor array when said sensor array is not exposed to X-radiation;

b) detecting second reference signals which are generated by the image elements of the sensor array when said sensor array is exposed to X-radiation;

c) determining defective image elements on the basis of the detected first and second reference signals; and d) detecting third electric signals which are generated by the image elements of the sensor array when said sensor array is exposed to an X-radiation representative of an image of an object; and e) producing the image by forming a respective output signal for the respective effective image elements using exclusively those third electric signals which are generated by image elements of the effective image element that have been determined as being non-defective.

Thus, according to the first aspect, the present invention provides a method for imaging in digital dental radioscopy making use of a sensor array in which a plurality of image elements forms a respective effective image element in the case of which defective image elements of the sensor array are initially determined on the basis of the detection of first and second reference signals. During the subsequent detection of the image of an object, only the image elements that have been determined as being non-defective are used. As has been stated hereinbefore, each effective image element comprises a plurality of image elements, the output signal for an effective image element being produced e.g. by taking an average of the detected signals of each image element of this effective image element. If defective image elements exist among the image elements, the output signal for the effective image element will, according to the present invention, be produced using exclusively those image elements of this effective image element that have been determined as being non-defective. It follows that the present invention permits sensor arrays including defective image elements to be used for dental radioscopy without any substantial deterioration of the quality of the image produced.

According to preferred embodiments of the present invention, defective image elements are determined by comparing the respective reference signals, which are detected for a specific image element, with a threshold value, an image element being determined as being defective when the reference signals of this image element deviate substantially from the threshold value. The value which may be used as a threshold value is e.g. the average of the first reference signals of all image elements or the average of the second reference signals of all image elements.

According to a second aspect of the invention, this object is achieved by a method for imaging in digital dental radioscopy making use of a sensor array having applied thereto a scintillation layer, the individual image elements of said sensor array being smaller than a desired local resolution so that a plurality of image elements forms a respective effective image element, comprising the steps of:

a) detecting electric signals which are generated by the image elements of the sensor array when said sensor array is exposed to an X-radiation that is representative of an image of an object;

b) assessing whether a signal detected for a respective image element indicates that the image element has been hit directly by an X-ray quantum, on the basis of signals which have been detected at least for neighbouring image elements; and c) producing an image of the object by forming a respective output signal for the respective effective image elements on the basis of only those electric signals which are associated with the image elements of the respective effective image element and which have been assessed as having not been hit directly by an X-ray quantum.

Thus, according to the second aspect, the present invention provides a method for imaging in digital dental radioscopy making use of a sensor array of the above-mentioned type in the case of which electric signals representing the image of an object are detected by means of the sensor array. Subsequently, a signal detected for a respective image element will be assessed so as to find out whether the image element has been hit directly by an X-ray quantum. This assessment is carried out on the basis of at least the image elements bordering on the image element to be assessed. The signal detected for the image element to be assessed is preferably compared with an average obtained from a plurality of signals which have been detected for neighbouring image elements; if the signal detected for the image element to be assessed deviates from the above-mentioned average to a predetermined degree, it will be assessed that the signal indicates that the associated image element has been hit directly by an X-ray quantum. During the subsequent production of the image, exclusively the output signals which do not indicate any direct hit by an X-ray quantum will be used. It follows that the present invention permits, according to the second aspect, an elimination or at least an essential reduction of the image noise caused by direct hits, whereby the image quality will be improved substantially.

Furthermore, the two above-mentioned aspects may be combined in one imaging method so that the combined method permits, on the one hand, low-quality sensors, i.e. sensors with a large number of image element defects and/or column and line defects, to be used for digital dental radioscopy and improves, on the other hand, the image quality by eliminating or substantially reducing the image noise caused by direct hits.

According to a third aspect of the present invention, this object is achieved by a device for digital dental radioscopy comprising:

an X-radiation source;

a sensor array having applied thereto a scintillation layer; and means for determining defective image elements on the basis of first reference signals, which are detected by means of the sensor array when said sensor array is not exposed to X-radiation, and on the basis of second reference signals which are detected when said sensor array is exposed to X-radiation, wherein the individual image elements of the sensor array are smaller than a desired local resolution so that a plurality of image elements forms a respective effective image element; and wherein means are provided for producing an image by generating an output signal for a respective effective image element using exclusively object signals which originate from image elements that have been determined as being non-defective.

According to a fourth aspect of the invention, this object is achieved by a device for digital dental radioscopy comprising:

an X-radiation source;

a sensor array having applied thereto a scintillation layer, wherein the individual image elements of the sensor array are smaller than a desired local resolution so that a plurality of image elements forms a respective effective image element, wherein means are provided for assessing whether an object signal of a respective image element indicates whether the image element has been hit directly by an X-ray quantum, on the basis of signals detected for at least the neighbouring image elements; and wherein means are provided for producing an image using exclusively those object signals which do not indicate that the associated image element has been hit directly by an X-ray quantum.

Thus, the present invention additionally provides devices which are suitable for executing the above-described methods. In comparison with conventional devices for digital dental radioscopy, the devices according to the present invention can be produced at a moderate price, since, as has been explained above, also low-quality sensors can be used in these devices. Furthermore, the devices according to the present invention also permit the production of images having a higher quality by reducing the image noise caused by direct hits.

The present invention is based on the finding that sensor arrays whose image elements are smaller than the desired local resolution can be used for dental radioscopy even if individual image elements of the sensor array are defective or if individual image elements of the sensor array provide incorrect output signals. Such incorrect output signals of individual image elements may be caused e.g. by the above-described "direct hits".

It follows that the present invention permits an improvement of the diagnostic expressiveness of dental X-radiographs while reducing simultaneously the production costs of the imaging devices by a reduction of the sensor costs.

Further developments of the present invention are specified in the dependent claims.

BRIEF DESCRIPTION OF THE DRAWINGS

In the following, preferred embodiments of the present invention will be explained in detail making referenced to the drawings enclosed.

DESCRIPTION OF PREFERRED EMBODIMENTS OF THE INVENTION

Figure 1:
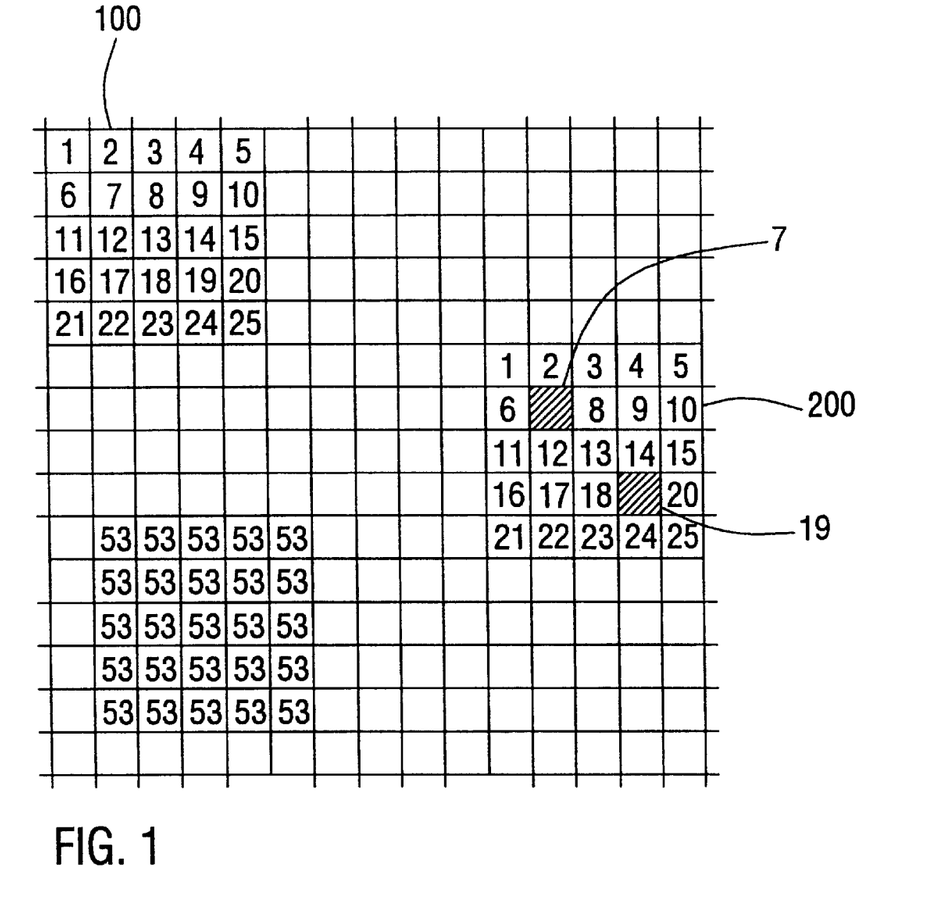
FIG. 1 shows schematically a detail of a sensor array which is suitable for carrying out the present invention.

As has already been stated hereinbefore, the present invention makes use of a sensor with image elements which are markedly smaller than would be necessary for the desired local resolution. A detail of such a sensor is schematically shown in the only figure of the present application. As can be seen in this figure, a plurality of image elements 1 to 25 forms a so-called effective image element 100. In the embodiment shown in the figure, each effective image element is formed by 5×5 image elements. It is, however, apparent that this number only serves as an example, other distributions being likewise imaginable. The resolution of digital X-ray sensors is, however, typically limited to approx. 50 μm so that the side length of an effective image element 100 is 50 μm. It follows that, in the embodiment shown, the individual image elements 1 to 25 each have an area of 10 μm×10 μm.

As has already been explained hereinbefore with reference to the prior art, the image information is read from the individual image elements by applying suitable clock signals, whereupon it is preprocessed, digitized and finally transmitted to a computer system, e.g. a personal computer, for display and storage. All the image elements are read in this way.

According to the present invention, an image under homogeneous irradiation of the sensor, a so-called bright image, is now produced and read out. Subsequently, a second image without irradiation of the sensor, a so-called dark image, is produced and read out. Characteristic features, e.g. a mean grey value, are determined in both images, whereupon all image elements whose output signals essentially deviate from the characeristic features are marked as being defective. For example, all image elements whose grey values in the dark image have a grey value above a predetermined threshold value can be marked as being defective. Likewise, all image elements having in the bright image a grey value below a predetermined grey value may be marked as being defective.

It will be advantageous to produce a dark image and a bright image by averaging a plurality of photographs without irradiation and with homogeneous irradiation, respectively. The influence of direct hits, i.e. hits by unconverted X-ray quanta, and of other noise sources can be reduced in this way, and this permits an improvement in the signal-to-noise ratio. The final bright image and the final dark image can, for example, be produced by image-elementwise averaging of e.g. 10 bright images and 10 dark images, respectively. According to preferred embodiments, the mean grey values and the associated standard deviation in the two averaged images, i.e. the final bright image and the final dark image, are then determined. All image elements whose grey value in the averaged dark image is above a predetermined threshold or whose grey value in the averaged bright image is below a predetermined threshold are marked as being defective. In the detail of a sensor shown in the figure, e.g. two image elements 7 and 19 are marked as being defective in the effective image element designated by 200.

When all defective image elements have been determined, effective image elements having the desired size, which depends on the local resolution demanded, are now produced according to the present invention in the computer system by averaging the output signals of neighbouring image elements when dental X-ray photographs are subsequently taken. In so doing, image elements which have been classified as defective image elements according to the above-described course of action are, however, left out of consideration. For example, for producing the signal indicative of the brightness value of the effective image element 200, all the image elements 1 to 25, with the exception of image elements 7 and 19, will be averaged.

The above course of action permits the use of sensor arrays for dental radioscopy even if individual image elements of the array are defective. On the one hand, the diagnostic expressiveness of the dental X-ray photographs can be improved in this way. On the other hand, the manufacturing costs of the sensors can be reduced. The number of defective image elements may increase due to damage caused by radiation after prolonged use of the sensor. In this case, it is advisable to repeat the above-described operation i.e. the recording of dark and bright images, periodically, e.g. whenever 100 X-ray photographs have been taken. This periodic repetition will guarantee that the sensor provides perfect output signals even after a prolonged period of use. As has already been explained hereinbefore, the influence of defective image elements on the output signal associated with an effective image element is eliminated according to the present invention by leaving the defective image elements out of consideration when averaging is carried out for the effective image element.

A second aspect of the present invention is that the image noise caused by direct hits is eliminated or at least strongly reduced so as to realize in the field of high-resolution dental radioscopy an improvement of the quality of an image detected by means of a sensor array. According to the present invention, the image noise component caused by direct hits in dental X-ray photographs is eliminated by comparing the information stored for an individual image element with the information of the neighbouring image elements. Since, due to the small image elements of the CCD sensor, the light of an X-ray quantum converted in the scintillator is detected not only in the image element located directly below the location of conversion but also in the neighbouring image elements, the image information in neighbouring image elements should approximately be of the same magnitude. If an image element of the CCD sensor is, however, directly hit by an X-ray quantum, it will contain considerably more image information than the neighbouring image elements which were not hit by an X-ray quantum.

Hence, a direct hit can be detected by comparing the image information of this image element with that of the neighbouring image elements. It can be assumed that the number of the direct hits on the CCD sensor is so small that, in the case of the irradiation time required, which is approx. 100 ms for preferred embodiments, only a comparatively small percentage of the image elements will usually be affected. Image elements which are classified as having been hit directly will not be taken into account in subsequent image processing.

For classifying whether image elements have been hit directly by X-ray quanta, the average of at least neighbouring image elements and the central image elements is taken for each image element after the recording of a dental X-ray image. For classifying the image element designated by 51 in the figure, it would e.g. be possible to use the image elements bordering thereon, which are each designated by 52 in the figure. Alternatively, it would be possible to take the average of the central image element 51 and of the surrounding 24 image elements, which are the respective image elements designated by 52 and 53 in the figure. Subsequently, it will be examined whether the image information stored for the image element to be classified 51 deviates substantially from the stored average. The image element to be classified can, for example, be marked as having been hit directly, if the image information associated therewith deviates from the average by at least twice the standard deviation value.

One problem may be that the number of image elements hit directly during the exposure time required is too large, i.e. that the number of image elements remaining for signal evaluation is too small. In this case, the exposure time can be subdivided into subexposure times by reading the sensor several times during the irradiation so that the condition specified, i.e. a small number of direct hits on the CCD sensor, is fulfilled for the subimages. When such subexposure times are employed, the CCD sensors which have been used for dental X-ray photographs up to now are, however, not so suitable, since, in the case of the typically used so-called full-frame CCD sensors, the image information will be blurred during the read-out process, when irradiation takes place at the same time. In this kind of CCD sensors, the image information is transmitted line by line to a read register where it is read, a process which normally takes several tenths of a second. If irradiation is continued during this process, i.e. if the next subexposure is carried out, the instantaneous subimages will overlap with the subimages displaced in the direction of the read register.

It follows that in such a case, where subexposure times are employed, it will be advantageous to use e.g. photodiode arrays in which each image element can be read directly. When such photodiode arrays are used, a blurring effect will definitely not occur. Furthermore, the use of such photodiode arrays offers the additional advantage that these photodiode arrays need not be operated in the integrating mode, i.e. using charge measurement, but they can also be operated in the current measurement mode. This will be of advantage, since the exposure time of conventional CCD X-ray sensors is limited by the storage capacity of the image elements, and this, in turn, limits the achievable signal-to-noise ratio and therefore, in the final analysis, the image quality. In the case of a photodiode array operated in the current measurement mode, the signal-to-noise ratio can, however, be improved by measuring the current frequently enough in each image element.

It follows that, in the foregoing, two aspects of the present invention have been described, which are each based on excluding from image processing image elements that do not provide correct signals representative of an image to be recorded. For this purpose, defective image elements are exclude from image processing according to the first aspect, whereas according to the second aspect the image elements excluded from image processing are those which have been hit directly by an X-ray quantum. It is obvious that the two above-mentioned aspects may be combined in one method.

In the case of the combined method, defective image elements are first determined in the way described hereinbefore. As has been described, it may be advantageous to repeat this determination periodically, e.g. whenever 100 X-ray photographs have been taken.

For taking an X-ray image of an object, the electric signals produced by each image element are first read in the manner known. Subsequently, it is determined which image elements have been hit directly. This is done by determining first the average and the standard deviation for all image elements which form an effective image element and which have not been marked as being defective. When the desired resolution is e.g. 50 $\mu$m and the size of the image element 10 $\mu$m, the average and the standard deviation are determined for 5×5 neighbouring image elements, as has been explained above. The image information of each image element in the effective image element is now compared with the respective average. If the image information deviates substantially, e.g. two standard deviations, from the average towards higher values, the image element will be marked as having been hit directly. Image elements which are classified as having been hit directly upon taking an X-ray photograph will not be taken into consideration when this X-ray photograph is being processed. Likewise, image elements which have been classified as being defective will be left out of account as has been explained hereinbefore.

It follows that for producing a signal indicative of the image information of a respective effective image element, the sum of the image information of all image elements of an effective image element which have not been hit directly and which are not marked as being defective will be formed. The resultant sum will then be weighted, i.e. multiplied, by a factor K. The factor K is calculated from the number of image elements in the effective image element divided by the number of image elements in the effective image element which have not been hit directly and which are not defective. This calculation is carried out for each effective image element of the image.

The above description applies in the same way when several subimages are integrated during the exposure time. The course of action described above is taken for each subimage, whereupon all subimages are added up image-elementwise.

The present invention therefore provides methods and devices permitting the production of high-quality X-ray images making use of an image sensor array which may comprise defective image elements. It follows that the number of rejects in the production of sensor arrays for dental radioscopy can be strongly reduced, and this will markedly reduce the costs for such sensor arrays. In addition, the present invention permits the recording of high-quality X-ray images, since image elements hit directly by X-ray quanta are not taken into account when the image is being processed. Images having an increased signal-to-noise ratio can be realized in this way.

The present invention can easily be combined with a method for image-elementwise correction of the electric signals produced by each element of a sensor means, so as to optimize the image quality; this kind of method is described e.g. in DE-A-19615178.

In order to carry out this kind of correction, a correction device is connected to the sensor means for correcting the electric signals which are produced by the CCD array and which represent together an image of an object, so as to compensate fluctuations of these electric signals of the individual elements of the CCD array caused by the dark current of these elements, by different conversion efficiencies of these elements and by inhomogeneities of the scintillation layer. In order to achieve this compensation, the above-described bright and dark signals can be used. While detecting the bright and dark signals, which can also be referred to as reference signals, and the signals corresponding to the image of an object, the sensor means is maintained at a constant temperature. The influence of the temperature dependence of the dark current and of the conversion efficiency of the individual image elements on the resultant image can be eliminated in this way. Such a correction device and the associated method permit, in spite of a reduced dose of X-rays, a production of high-quality images in the case of which a deterioration of the image quality caused by production-dependent differences in the dark current and in the conversion efficiency of the individual image elements of the sensor means as well as by inhomogeneities of the scintillation layer is prevented.

According to the first aspect or a combination of the first and of the second aspect of the present invention, the bright and dark image produced can be used as reference signals for this correction method. If only the second aspect of the present invention is realized, the reference signals required for the correction method must be produced separately.

In the following, an example of such a correction method will be explained in detail.

As has been stated hereinbefore, production-dependent differences may influence both the dark signal of an image element, i.e. the grey value of the pixel without irradiation, and the conversion efficiency in the case of a predetermined irradiation, i.e. the grey value of the pixel in the case of this predetermined irradiation. The electric signal produced by CCD sensors varies almost linearly with the illumination intensity. The digital grey value $Gw_{ij}$ of a pixel in a line i and a column j of a sensor array can therefore be described by the following equation at a predetermined irradiation intensity:

$$Gw_{ij}(I)=0_{ij}+G_{ij}I \quad (1)$$

wherein $Gw_{ij}$ is the grey value, $0_{ij}$ is the offset caused by the dark signal, $G_{ij}$ is the gain, and I is the irradiation intensity. $0_{ij}$ and $G_{ij}$ may differ from one pixel to the next.

A further problem results from the fact that the offset $0_{ij}$ is strongly temperature-dependent, and, consequently, the grey value of an image element depends not only on the radiation intensity but also on the temperature:

$$Gw_{ij}(T,I)=0_{ij}(T)+G_{ij}I \quad (2)$$

For correcting the fixed pattern noise for a fixedly predetermined temperature T, the values for $0_{ij}$ and $G_{ij}$ are determined for each pixel, i.e. for each sensor element of the sensor array. For determining these values, two images are required: one image without irradiation and one image at a known irradiation. The known irradiation may, for example, be the maximum admissible irradiation.

To suppress the quantum-dependent image noise, these images in the absence of irradiation and at a known irradiation are advantageously produced by averaging a plurality of photographs taken under constant conditions. It follows that, from the preferably averaged images, the grey values in the absence of irradiation and at a known irradiation I* are known for each image element:

$$Gw_{ij}(T,I=0)=0_{ij}(T) \quad (3)$$

$$Gw_{ij}(T,I=I^*)=0_{ij}(T)+G_{ij}I^* \quad (4)$$

$Gw_{ij}(T,I=0)$ is the grey value of the pixel in line i and column j of the sensor, when the sensor means is not exposed to any X-radiation by an X-radiation source. This grey value corresponds to the temperature-dependent offset $0_{ij}(T)$ of the pixel. $Gw_{ij}(T,I=I^*)$ is the grey value of the pixel at an X-radiation having the intensity I*. This grey value is composed of the offset $0_{ij}$ and the intensity I* multiplied by the gain $G_{ij}$ of the pixel.

By pixelwise subtraction of equation 4 minus equation 3, the grey value of the pixel without offset components is obtained:

$$Gw'_{ij}(T,I=I^*)=Gw_{ij}(T,I=I^*)-G_{ij}(T,I=0)=G_{ij}I^* \quad (5)$$

For producing a high-quality image by means of a sensor array, all pixels, i.e. sensor elements, of the array must have the same grey value $Gw_{max}$, when they are irradiated with the same maximum admissible dose. Differences in the sensitivity can be eliminated by normalizing the values $G_{ij}$. The normalized gain $G_{ij}'$ for each pixel can be calculated from the equation $$Gw_{max}=Gw'_{ij}(T,I=I^*)G_{ij}' \quad (6)$$

$Gw_{max}$ represents a desired value at a maximum irradiation which all the pixels of the sensor array should have. The correction value $G_{ij}'$ therefore indicates a factor by which the grey value of each pixel has to be multiplied so that the same grey value will be output for each pixel at a uniform irradiation of all sensor elements.

Correction of an image characterized by the grey values $Gw_{ij}$ takes place as follows: the corrected grey values $Gw'_{ij}$ are obtained by pixelwise subtraction of the offset values $0_{ij}$ of each pixel from the grey values of each pixel representing an image and the subsequent pixelwise multiplication with the gain normalization values $G_{ij}'$.

$$Gw'_{ij}=(Gw_{ij}-0_{ij})G_{ij}'(7)$$

Equations (1) to (7) represent the basis for the correction method for improving the image quality. These equations can be used for pixelwise gain and offset correction in the field of dental digital radiography.

As has already been explained hereinbefore, the offset values $0_{ij}$ and, consequently, also the gain normalization values $G_{ij}'$ are strongly temperature-dependent. When the offset values and the gain normalization values are determined at a certain temperature, whereas the image to be corrected is recorded at a different temperature, it is highly probable that the image quality will not be improved but deteriorated The temperature of the CCD sensor must therefore be kept constant during detection of the reference signals and during detection of the signals representing an image. A constant sensor temperature can be realized in different ways.

The CCD sensor can be provided with a heating element at its back, the temperature of the sensor being then kept constant by active control. In order to measure the temperature, e.g. temperature sensors may additionally be applied to the support of the CCD sensor or they may also be integrated in the CCD sensor. If the sensor has applied thereto unexposed CCD elements, so-called "dark reference pixels", these elements can be used for temperature measurement due to the strong temperature dependence of the dark current.

Furthermore, the temperature can, if desired, be controlled by controlling the clock frequency of the CCD sensor. Also in this case, the temperature of the sensor means can be detected, e.g. by means of temperature sensors which are additionally applied to the support of the CCD sensor, so as to permit a regulated control of the temperature of the sensor means.

In the case of intra-oral X-ray diagnostic units, the sensor element can be maintained at a predetermined temperature, e.g. in a water bath, between two X-ray photographs. This predetermined temperature may, for example, be the body temperature. This will guarantee that the sensor element will not cool down between the X-ray photographs.

A further substantial prerequisite for successfully using the gain/offset correction is that the position of the sensor means relative to the X-radiation source is constant or that it is at least guaranteed that the X-ray dose power is constant over the whole sensor area so as to avoid a fall-off in image brightness towards the edge of the image, a so-called "shading". If the sensor means does not have a constant irradiation geometry relative to the X-radiation source, gain correction will not be carried out correctly, and this will result in artificial shading. In order to avoid this problem, an arrangement which is analogous to a film holder and in the case of which the centre of the CCD sensor is hit by the central beam of the X-radiation source may, for example, be used.

It follows that the correction method provides optimization of the image quality in the field of digital dental radiography by making use of pixelwise gain and offset correction at a constant temperature of the sensor means. The pixelwise gain/offset correction eliminates the aftereffects of production-dependent differences in the dark current and in the conversion efficiencies of the individual image elements as well as the aftereffects of inhomogeneities in the scintillation layer applied to the CCD sensor. Prerequisites for the improvement of the image quality by a pixelwise gain/offest correction are (a) a constant temperature of the CCD sensor and (b) a constant irradiation geometry or a homogeneous irradiation.

Hence, the correction method described, together with the method according to the present invention, permits the production of images of even higher quality even if the irradiation intensities used are lower than the normally used doses of X-radiation.

As has already been stated, the CCD array described may also be replaced by a photodiode array or a charge-injection device or a CMOS image sensor array.

Figure 2:
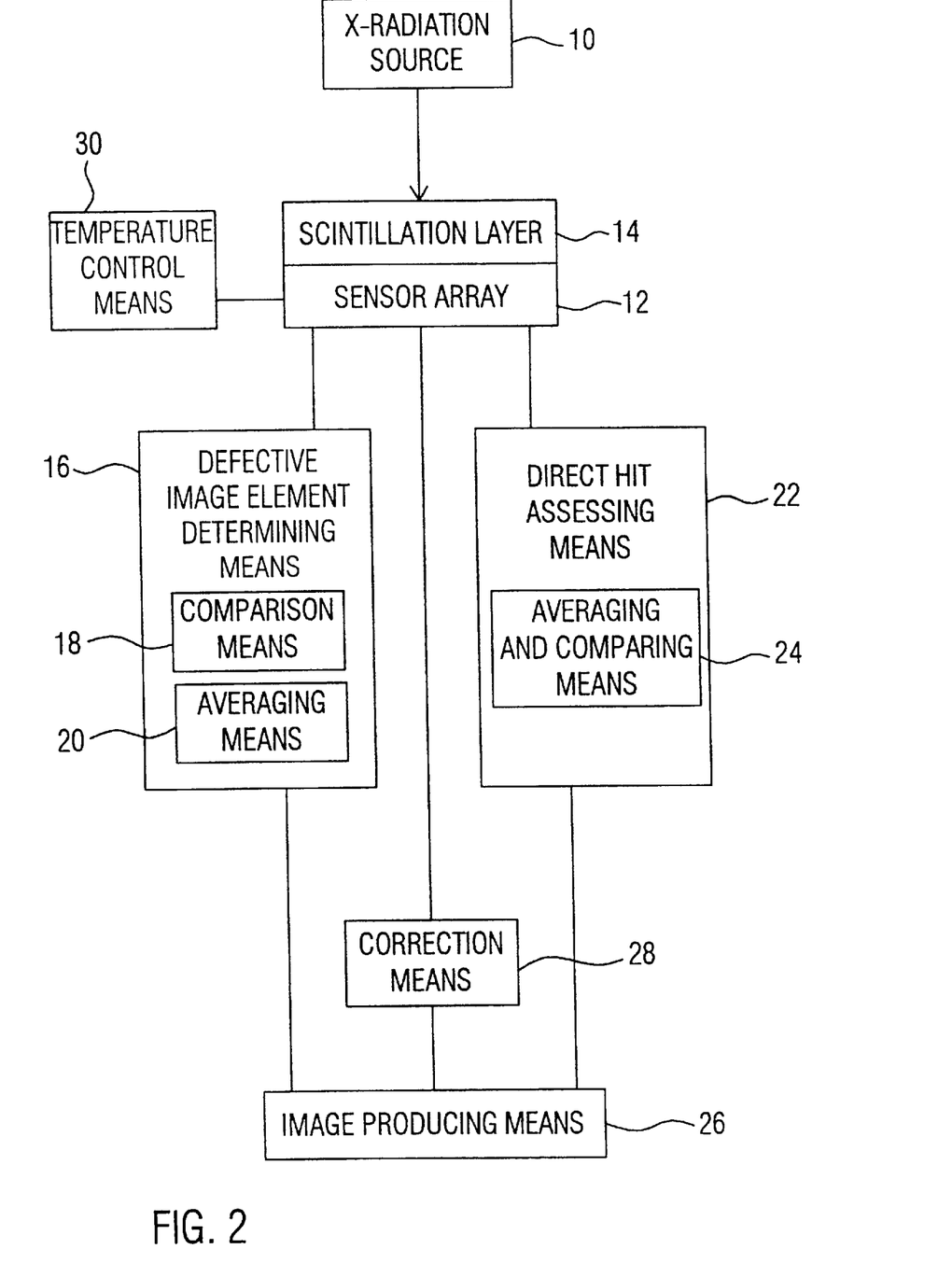
FIG. 2 shows a schematic view of an embodiment of a device for digital dental radioscopy according to the invention.

The embodiment of a device for digital dental radioscopy shown in FIG. 2 comprises an X-radiation source 10 and a sensor array 12 having applied thereto a scintillation layer 14. A means for determining defective image elements 16 is provided having a comparison means 18 for comparing the first reference signals of a respective image element with a first threshold value and for comparing the second reference signal of the respective image element with a second threshold value. In addition, the defective image element determining means 16 comprises an averaging means for forming an average from all first reference signals as a first threshold value and for taking an average from all second reference signals as a second threshold value. In addition, the device for digital dental radioscopy comprises a direct hit assessing means 22 for assessing whether an object signal associated with a respective image element indicates that the image element has been hit directly by an X-ray quantum. The direct hit assessing means 22 comprises an averaging and comparing means 24 for taking an average from the object signals associated at least with the neighbor image elements and for comparing the average value with the object signal to be assessed. In addition, an image producing means 26 is provided for producing an image by generating an output signal for a respective effective image element using exclusively object signals which original from image elements that have been determined as being non-defective and object signals which do not indicate that the associated image element has been hit directly by an X-ray quantum.

Further provided is a correction means 28 for correcting the object signals so as to compensate fluctuations of the object signals of the individual image elements of the sensor array caused by a dark current of these elements, by different conversion efficiency of these elements and by inhomogenities of the scintillation layer. Finally, a temperature control means 30 for maintaining the temperature of the sensor array at a constant temperature is provided.

What is claimed is:

1. A method for imaging in digital dental radioscopy making use of a sensor array, the individual image elements of which are smaller than a desired local resolution, so that a plurality of image elements forms a respective effective image element, comprising the steps of:

a) detecting first reference signals which are generated by the image elements of the sensor array when said sensor array is not exposed to X-radiation;

b) detecting second reference signals which are generated by the image elements of the sensor array when said sensor array is exposed to X-radiation;

c) determining defective image elements on the basis of the detected first and second reference signals;

d) detecting third electric signals which are generated by the image elements of the sensor array when said sensor array is exposed to an X-radiation representative of an image of an object; and e) producing the image by forming a respective output signal for the respective effective image elements using exclusively those third electric signals which are generated by image elements of the effective image element that have been determined as being non-defective.

2. A method according to claim 1, wherein the image elements determined as being defective in step c) are image elements whose first reference signal exceeds a first threshold value to a predetermined degree or whose second reference signal is lower then a second threshold value by a predetermined degree.

3. A method according to claim 2, wherein the first predetermined threshold value is formed from all first reference signals by averaging and wherein the second predetermined threshold value is formed from all second reference signals by averaging.

4. A method according to claim 3, wherein said first predetermined threshold value and said second predetermined threshold value are each formed by averaging first and second reference signals obtained during repeated execution of steps a) and b).

5. A method according to claim 1, wherein steps a), b) and c) are each carried out periodically, when steps d) and e) has been carried out a certain number of times.

6. A method according to claim 1, wherein the output signal for a respective effective image element is formed by averaging the third electric signals of the image elements of the effective image element.

7. A method according to claim 1, wherein, after step d), an additional assessment step d1) is carried out for assessing whether a third signal detected for a respective image element indicates that said image element has been hit directly by an X-ray quantum, said step d1) being carried out on the basis of third signals which have been detected at least for neighbouring image elements;

and wherein in step e) only those third electric signals are used which have been determined as being non-defective and the assessment of which showed that they have not been hit directly by an X-ray quantum.

8. A method according to claim 7, wherein in step d1) an image element is assessed as having been hit directly by an X-ray quantum when the third signal detected for this image element deviates to a predetermined degree from an average of the third signals associated with at least the neighbouring image elements.

9. A method according to claim 8, wherein an image element is assessed as having been hit directly by an X-ray quantum when the third signal detected for this image element deviates to a predetermined degree from an average of all third signals associated with neighbouring image elements bordering on this image element, or from an average of all third signals associated with said neighbouring image elements and the image elements bordering on said neighbouring image elements.

10. A method according to claim 8, wherein in step d) third electric subsignals are produced with a short exposure time in temporal succession, said subsignals being combined so as to form the respective third electric signals, said step d1) being carried out for each of the third electric subsignals.

11. A method according to claim 2, wherein the sensor array is controlled to a constant temperature during steps a), b) and d), said method comprising additionally the following step:

correcting the third electric signals on the basis of the first and second reference signals so as to compensate fluctuations of said third electric signals of the individual image elements caused by the dark current of these elements, by different conversion efficiencies of these elements and by inhomogeneities of a scintillation layer applied to the sensor array.

12. A method according to claim 1, wherein the sensor array is exposed to homogeneous X-radiation in step b).

13. A method for imaging in digital dental radioscopy making use of a sensor array having applied thereto a scintillation layer, the individual image elements of said sensor array being smaller than a desired local resolution so that a plurality of image elements (1 to 25) forms a respective effective image element, comprising the steps of:

a) detecting electric signals which are generated by the image elements of the sensor array when said sensor array is exposed to an X-radiation that is representative of an image of an object;

b) assessing whether a signal detected for a respective image element indicates that the image element has been hit directly by an X-ray quantum, on the basis of signals which have been detected at least for neighbouring image elements; and c) producing an image of the object by forming a respective output signal for the respective effective image elements on the basis of only those electric signals which are associated with the image elements of the respective effective image element and which have been assessed as having not been hit directly by an X-ray quantum.

14. A method according to claim 13, wherein in step b) an image element is assessed as having been hit directly by an X-ray quantum when the signal detected for this image element deviates to a predetermined degree from an average of the detected electric signals associated with at least the neighbouring image elements.

15. A method according to claim 14, wherein an image element is assessed as having been hit directly by an X-ray quantum when the third signal detected for this image element deviates to a predetermined degree from an average of all third signals associated with neighbouring image elements bordering on this image element, or from an average of all third signals associated with said neighbouring image elements and the image elements bordering on said neighbouring image elements.

16. A method according to claim 13, wherein in step a) electric subsignals are produced making use of a subexposure time in temporal succession, said subsignals being combined so as to form the respective third electric signals, said step b) being carried out for each of the third electric subsignals.

17. A method according to claim 13, comprising the following steps carried out pior to step a):

a') detecting first reference signals which are generated by the image elements of the sensor array when said sensor array is not exposed to X-radiation;

a") detecting second reference signals which are generated by the image elements of the sensor array when said sensor array is exposed to X-radiation;

wherein the sensor array is controlled to a constant temperature during steps a'), a") and a); and correcting on the basis of the first and second reference signals the electric signals detected in step a) so as to compensate fluctuations of said detected electric signals of the individual image elements caused by the dark current of these elements, by different conversion efficiencies of these elements and by inhomogeneities of a scintillation layer applied to the sensor array.

18. A method according to claim 17, wherein the sensor array is exposed to a homogeneous X-radiation in step a").

19. A device for digital dental radioscopy comprising:

an X-radiation source;

a sensor array having applied thereto a scintillation layer, means for determining defective image elements on the basis of first reference signals, which are detected by means of the sensor array when said sensor array is not exposed to X-radiation, and on the basis of second reference signals which are detected when said sensor array is exposed to X-radiation, wherein the individual image elements of the sensor array are smaller than a desired local resolution so that a plurality of image elements forms a respective effective image element; and wherein means are provided for producing an image by generating an output signal for a respective effective image element using exclusively object signals which originate from image elements that have been determined as being non-defective.

20. A device according to claim 19, wherein the means for determining defective image elements includes comparison means for comparing the first reference signal of a respective image element with a first threshold value and for comparing the second reference signal of the respective image element with a second threshold value.

21. A device according to claim 20, including in addition averaging means for forming and average from all first reference signals as a first threshold value and for taking an average from all second reference signals as a second threshold value.

22. A device according to claim 19, wherein the means for producing an image includes means for generating a respective output signal for a respective effective image element by taking an average from object signals of those image elements of said effective image element which have been determined as being non-defective.

23. A device according to claim 19, including in addition means for assessing whether an object signal associated with a respective image element indicates that the image element has been hit directly by an X-ray quantum, image elements which have been hit by an X-ray quantum being not taken into account when the image is being produced.

24. A device according to claim 19, comprising in addition the following features:

a correction means for correcting the object signals so as to compensate fluctuations of the object signals of the individual image elements of the sensor array caused by the dark current of these elements, by different conversion efficiencies of these elements and by inhomogeneities of the scintillation layer; and a temperature control means for maintaining the sensor array at a constant temperature.

25. A device according to claim 19, wherein said means for determining defective image elements determines said image elements on the basis of first reference signals which are detected when said sensor array is not exposed to X-radiation, and on the basis of second reference signals which are detected when said sensor array is exposed to a homogeneous X-radiation.

26. A device for digital dental radioscopy comprising: an X-radiation source;

a sensor array having applied thereto a scintillation layer, the individual image elements of the sensor array being smaller than a desired local resolution so that a plurality of image elements forms a respective effective image element;

means for assessing whether an object signal of a respective image element indicates whether the image element has been hit directly by an X-ray quantum, on the basis of signals detected for at least the neighbouring image elements; and means for producing an image using exclusively those object signals which do not indicate that the associated image element has been hit directly by an X-ray quantum.

27. A device according to claim 26, wherein said assessing means comprises means for taking an average from the object signals associated at least with the neighbouring image elements and means for comparing said average value with the object signal to be assessed.

28. A device according to claim 27, wherein said averaging means comprises means for taking an average from the object signals which are associated with neighbouring image elements bordering on this image element, or an average from the object signals associated with said neighbouring image elements and the image elements bordering on said neighbouring image elements.

29. A device according to claim 26, wherein said image-forming means comprises means for generating a respective output signal for a respective effective image element by taking an average from those object signals of this effective image element which do not indicate that the associated image element has been hit directly by an X-ray quantum.

30. A device according to claim 26, comprising in addition the following features:

a correction means for correcting the object signals so as to compensate fluctuations of the object signals of the individual image elements of the sensor array caused by the dark current of these elements, by different conversion efficiencies of these elements and by inhomogeneities of the scintillation layer; and a temperature control means for maintaining the temperature of the sensor array at a constant temperature.

* * * * *